(12) United States Patent
Pearce et al.

(10) Patent No.: US 6,497,915 B2
(45) Date of Patent: *Dec. 24, 2002

(54) WHEY PROTEIN AND CARRAGEENAN HEAT-SET GELS

(75) Inventors: Robert John Pearce, Beaumaris (AU); John Arthur Dunkerley, Cheltenham (AU); Tanya Wendy Wheaton, Highett (AU)

(73) Assignee: Scientific and Industrial Research Organisation, Australian Capitol Territory (AU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/155,780

(22) PCT Filed: Apr. 9, 1997

(86) PCT No.: PCT/AU97/00225

§ 371 (c)(1),
(2), (4) Date: May 5, 1999

(87) PCT Pub. No.: WO97/37548

PCT Pub. Date: Oct. 16, 1997

(65) Prior Publication Data

US 2002/0028277 A1 Mar. 7, 2002

(30) Foreign Application Priority Data

Apr. 9, 1996 (AU) ............................................. PN 9133

(51) Int. Cl.[7] ..................... A23L 1/0532; A23L 1/0562; A23J 3/08
(52) U.S. Cl. ...................................................... 426/573
(58) Field of Search ................................ 426/573, 583, 426/654, 658, 506, 508, 509, 520, 41

(56) References Cited

U.S. PATENT DOCUMENTS

| | | | | |
|---|---|---|---|---|
| 5,063,073 A | * | 11/1991 | Kratochvil | 426/573 |
| 5,104,674 A | * | 4/1992 | Chen et al. | 426/573 |
| 5,252,352 A | * | 10/1993 | Benach et al. | 426/580 |
| 5,368,871 A | | 11/1994 | Konstance | |
| 5,458,904 A | | 10/1995 | Zolper | 426/46 |
| 5,480,670 A | * | 1/1996 | Pordy | 426/580 |

FOREIGN PATENT DOCUMENTS

| | | |
|---|---|---|
| AU | 22730/92 A | 1/1993 |
| AU | 74288/94 | 4/1995 |
| AU | 30436/95 | 3/1996 |
| EP | 0 046 639 A | 3/1982 |
| EP | 298561 | 1/1989 |
| JP | 63 012269 A | 1/1988 |
| WO | WO96/11587 | 4/1996 |

OTHER PUBLICATIONS

"Interactions in protein/polysaccharide/calcium gels" by V.M. Bernal et al, Journal of Food Science, vol. 52, No. 5, pp. 1121–1136, May 1987.

Applications for Cheese Whey Protein Fractions, R.J. Pearce, CSIRO Division of Food Processing, Highett, Vic. 3190, Food Research Quarterly vol. 51. No. 1 & 2, Feb. 1991.

* cited by examiner

Primary Examiner—Keith Hendricks
(74) Attorney, Agent, or Firm—Sughrue Mion, PLLC

(57) ABSTRACT

This invention relates to a food ingredient, comprising a heat-set protein gel and a polysaccharide hydrocolloid which is present in an amount sufficient to influence the structure and texture of the gel, and a process for the preparation of the food ingredient.

22 Claims, 15 Drawing Sheets

GRAPH 12

Texture profiles of heat-set gels from whey protein concentrate (WPC)

GRAPH 15

Texture profiles of heat-set gels from egg white protein

WHEY PROTEIN AND CARRAGEENAN HEAT-SET GELS

This invention relates to food ingredients, to methods for the preparation of such food ingredients and to food products comprising such ingredients. The invention is particularly, but not exclusively, concerned with food ingredients for use in reduced-fat foods, and with the use of dairy whey protein in the preparation of such reduced-fat foods.

Whey is the co-product from the manufacture of dairy products which utilise the casein proteins of milk. It contains principally lactose, minerals and the whey proteins representing approximately 20% of the total protein of cows' milk. The whey proteins are represented in majority by the two proteins, α-lactalbumin and β-lactoglobulin. In a previous invention a process was described for the fractionation of these major whey proteins in Australian Patent No. 616,411.

International Patent Application No. WO93/00832 (PCr/AU92/00331) (the full disclosure of which is hereby incorporated herein) describes gelled food products in which microparticulate suspensions are stabilised in heat-set gels for food applications. When restricted protein unfolding occurs as a result of heating certain globular proteins in solution, gelation may occur if specific interactions between protein molecules enable an ordered three-dimensional network to be formed. Such interactions affect intermolecular cross-lining involving hydrogen bonding, ionic and hydrophobic interactions. Adjuncts to such interacting protein systems which affect some or all of such cross-linking mechanisms may serve to modify the overall structure, texture and rheological problems of the gelled product.

Of the milk proteins. only certain of the whey proteins are capable of heat-induced gelation, β-lactoglobulin is considered to be the most important whey protein for gelation since it is capable of forming uniform gels of high strength. Application of the whey protein fractionation technology developed by Pearce, yields a product which is highly enriched in β-lactoglobulin and referred to as "β-Fraction". This product also displays the capability of forming uniform gels of high strength. (see Pearce, R. J. (1991) Applications of cheese whey protein fractions. Food Research Quarterly 51; 74–91.)

Stading and Hermnansson have described the structure and appearance of β-lactoglobulin gels over a range of pH values and have described the clear gels formed below pH 4.0 and above about pH 6.5 as fine-stranded gels and the more turbid gels formed at intermediate pH as aggregate gels. The fine stranded gels formed at low pH were brittle but in the higher pH range were rubber-like. (see Stading, M. & Hermansson. A. M. (1991) Large deformation properties of β-lactoglobulin gel structures. Food Hydrocolloids 5: 339–352.) The ability to form heat-set gels from food proteins is not limited to β-lactoglobulin or to whey proteins. For example, heat set gelation of egg white protein is well known. Variation in the appearance and texture of such egg white gels may be achieved by manipulation of the ionic strength and pH as has been described by Hegg, P. O. (1982) Conditions for the formation of heat-induced gels of some globular food proteins. *Journal of Food Science* 47, 1241–1244. in a manner similar to that shown for β-lactoglobulin by Stading, M and Hermansson, A-M. (1993) Large deformation properties of β-lactoglobulin gels. *Food Hydrocolloids* 5, 339–352.

By combining the results, described in International Patent Application No. WO93/00832 with the results of Stading et al., we identified novel gelled food products in which the appearance and texture of the gelled product could be varied from clear to opaque and from elastic to inelastic according to the environmental conditions of the protein during the heat-gelation process. The resulting products demonstrated rheological characteristics of potential value in the formulation of novel foods. However, under textural analysis, these products, whether essentially elastic or inelastic. showed distinct yield points (gel breaking points). This property was considered undesirable for certain food applications.

We have now found that incorporation of a polysaccharide hydrocolloid into a heat-gelled protein results in a gelled material having a modified structure and texture which, rheologically does not display a distinct fracture point (gel breaking point). In this behavior, the gelled product exhibits the textural and Theological properties of a fat (exemplified herein by a texture profile of lard, see FIG. 13) and enables the material to be utilized as a food ingredient, e.g., a texture modifier, in food products, and especially as an ingredient in reduced-fat foods.

Figure 1:
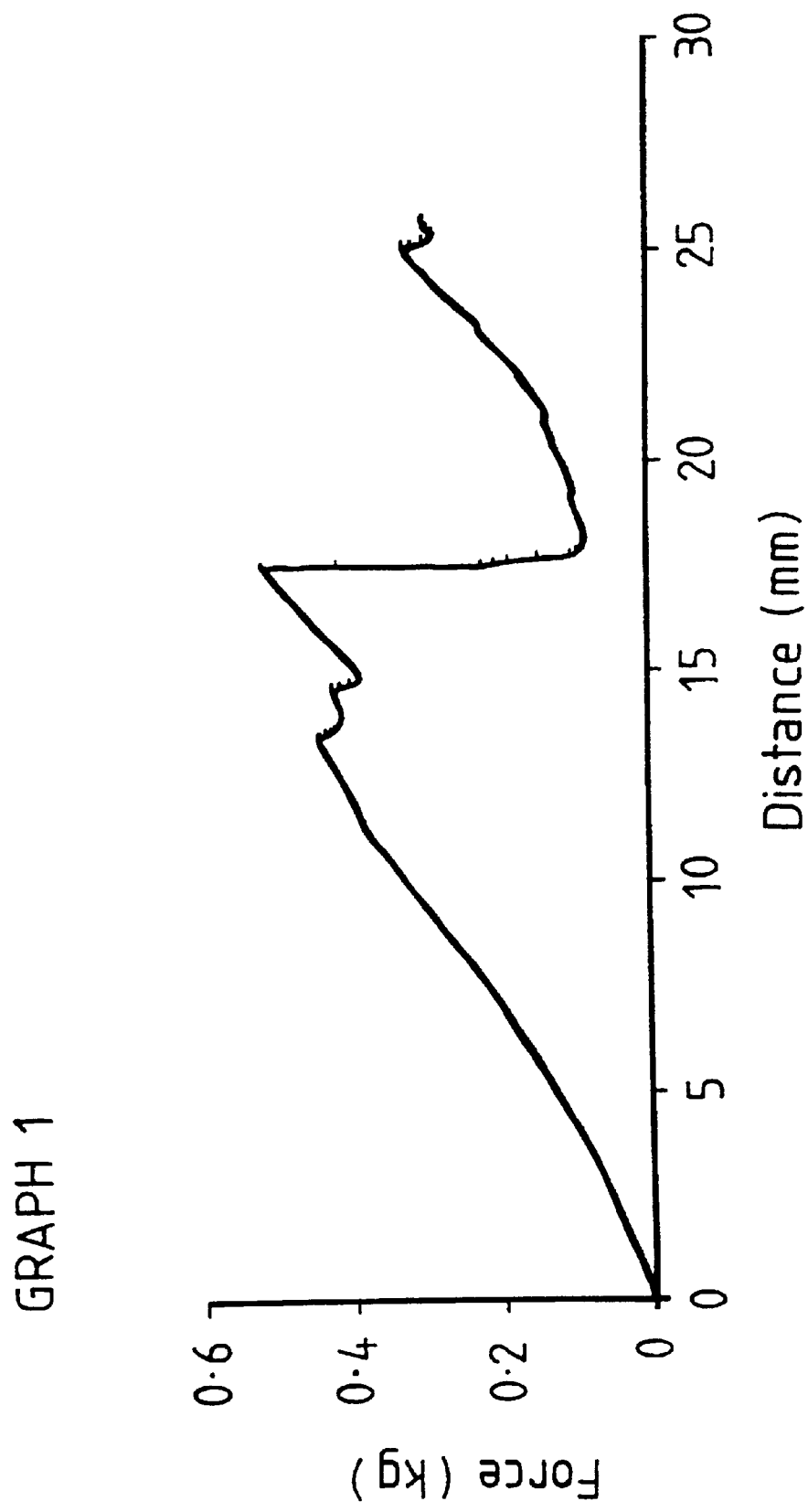
FIG. 1 shows a texture profile for a gelled product containing no suspended microparticles with no carrageenan.
Figure 2:
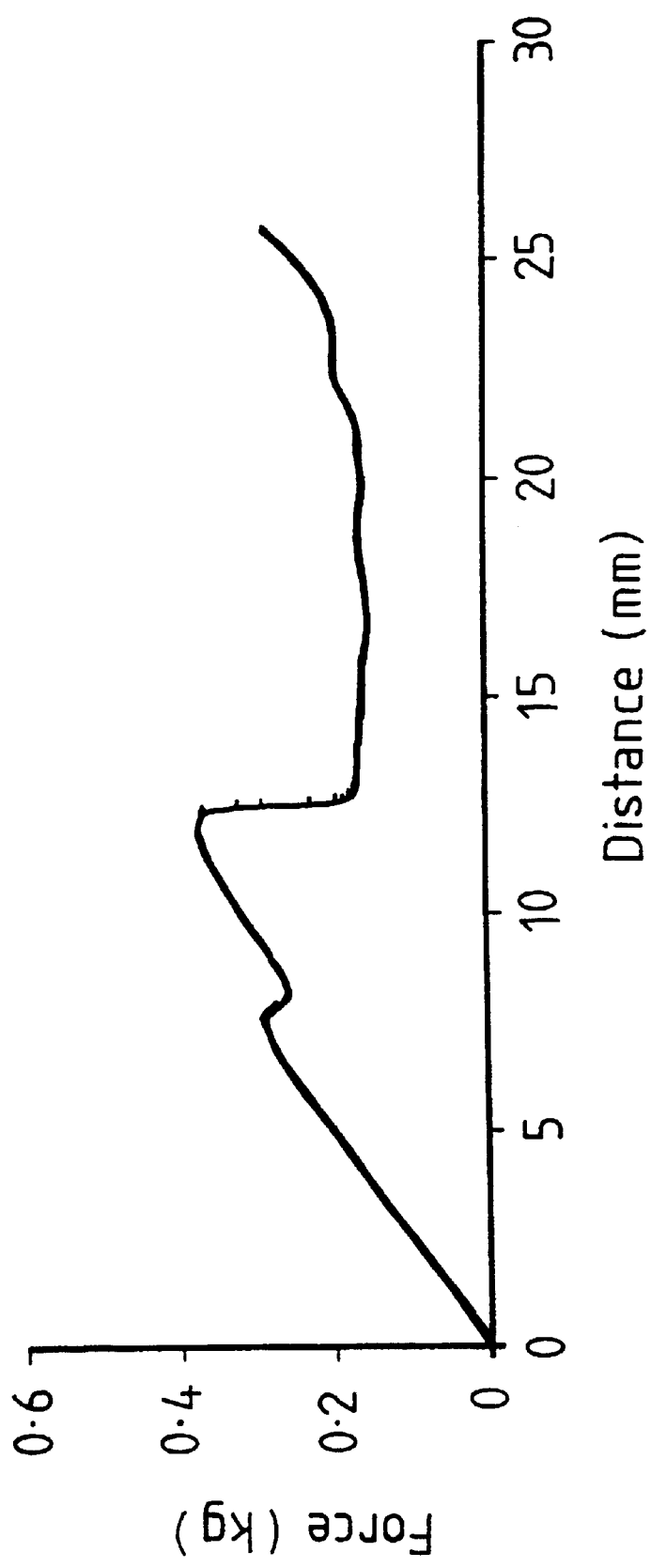
FIG. 2 shows a texture profile for a gelled product containing no suspended microparticles with 0.10% w/w iota-carrageenan.
Figure 3:
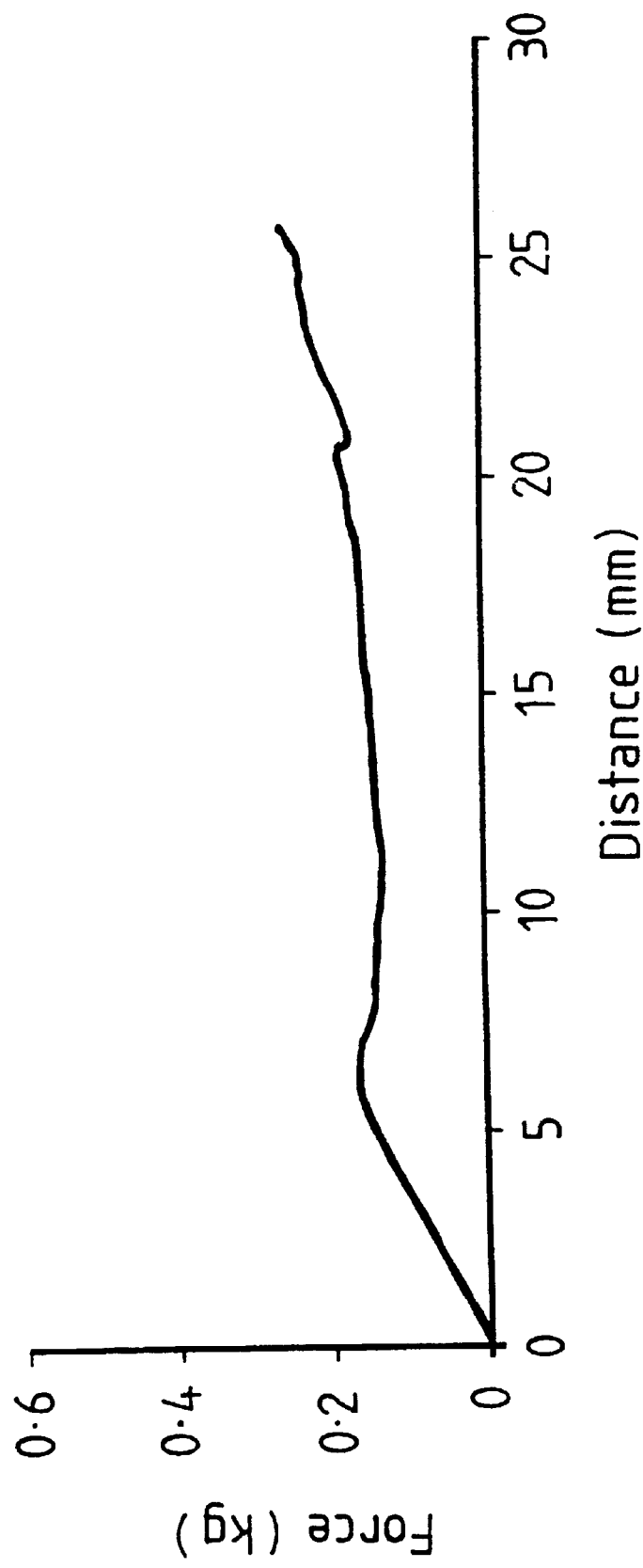
FIG. 3 shows a texture profile for a gelled product containing no suspended microparticles with 0.30% w/w iota-carrageenan.
Figure 4:
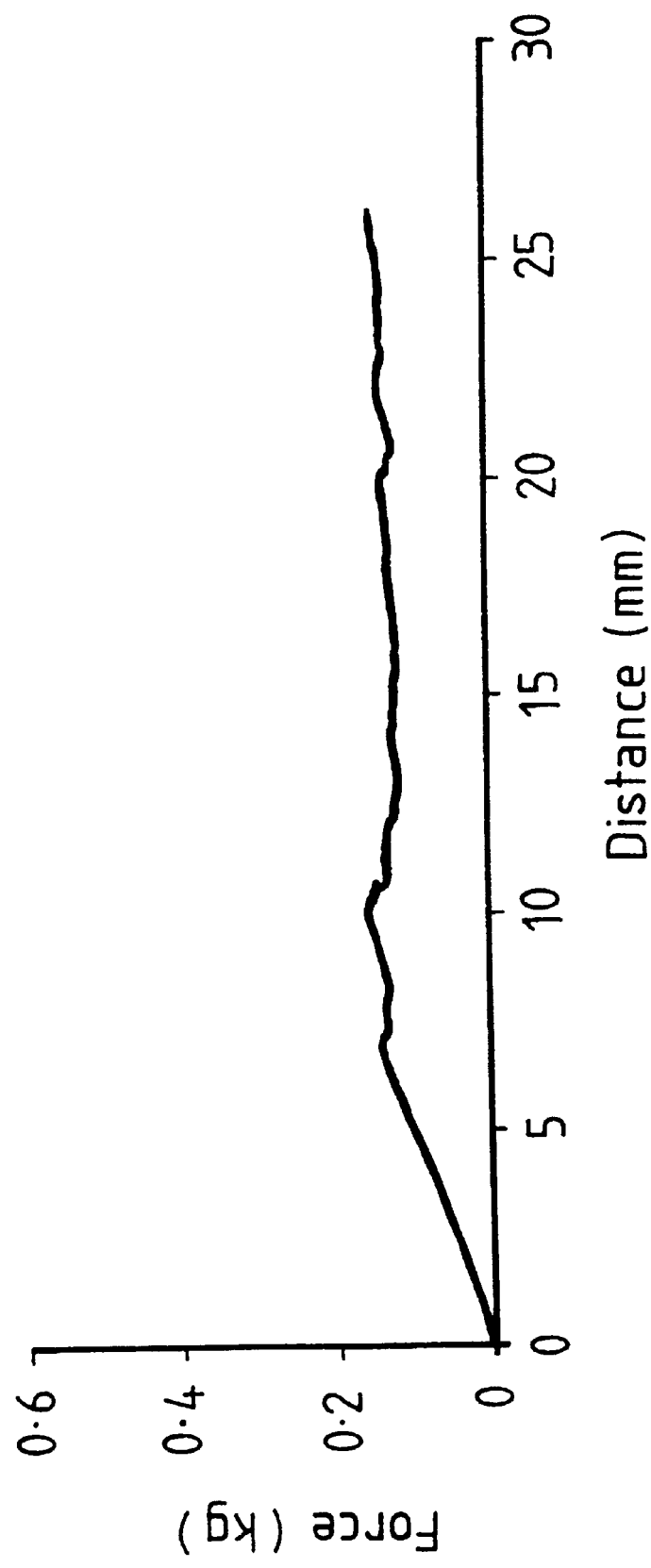
FIG. 4 shows a texture profile for a gelled product containing no suspended microparticles with 0.10% w/w kappa-carrageenan.
Figure 5:
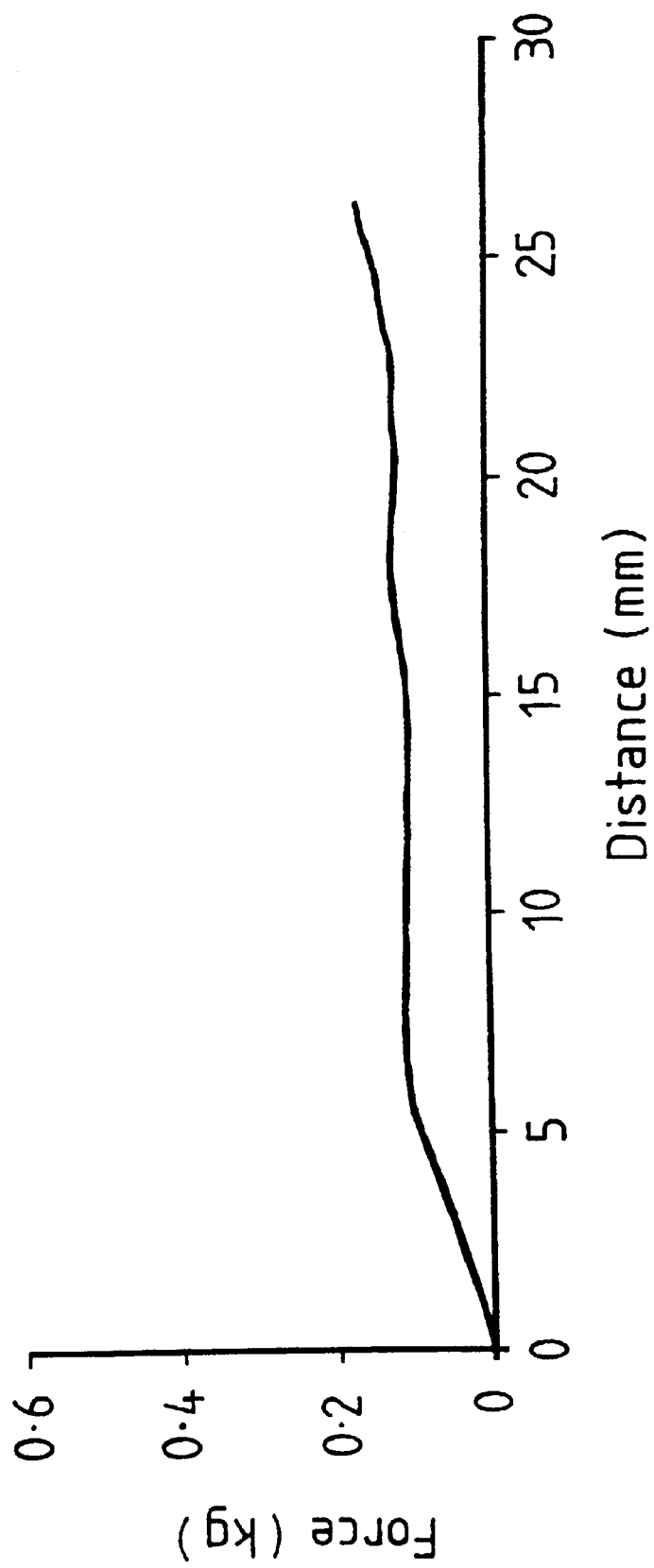
FIG. 5 shows a texture profile for a gelled product containing no suspended microparticles with 0.30% w/w kappa-carrageenan.
Figure 6:
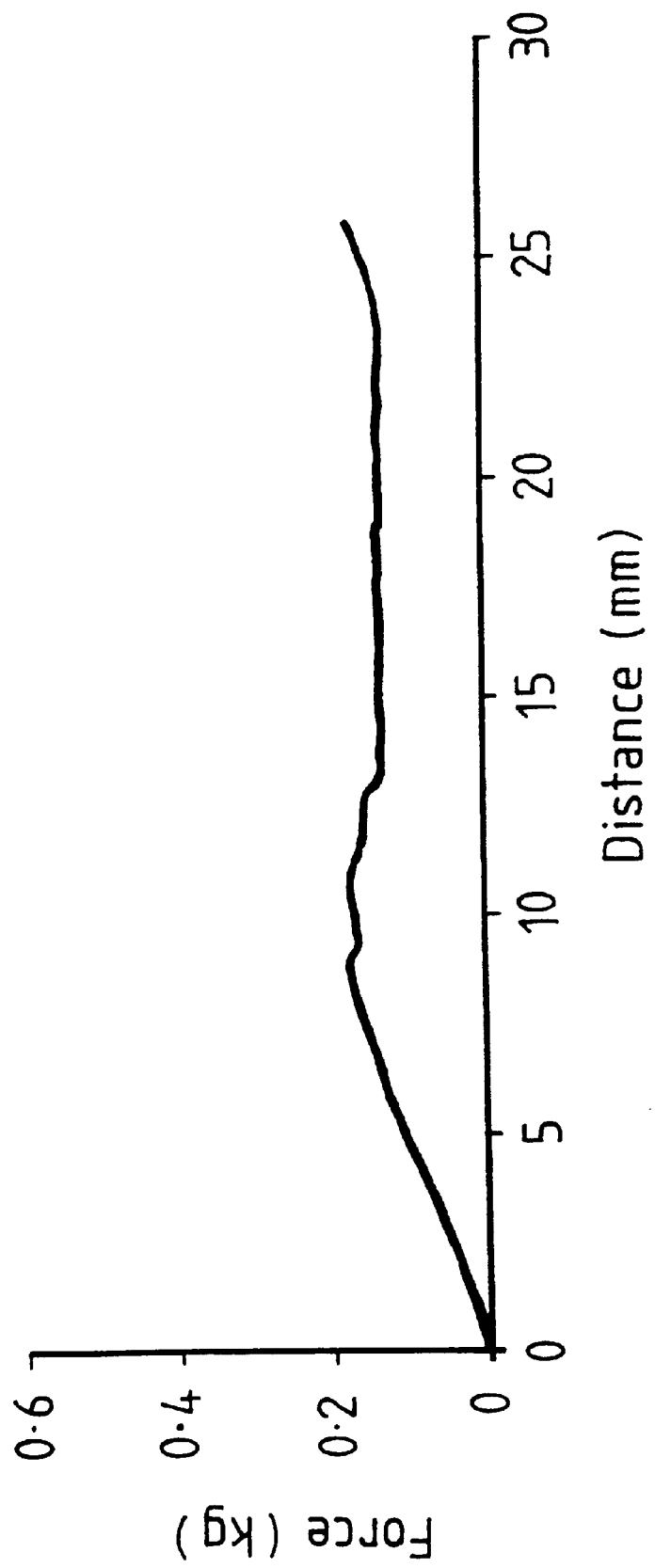
FIG. 6 shows a texture profile for a gelled product containing suspended microparticles with no carrageenan.
Figure 7:
FIG. 7 shows a texture profile for a gelled product containing suspended microparticles with 0.05% w/w iota-carrageenan.
Figure 8:
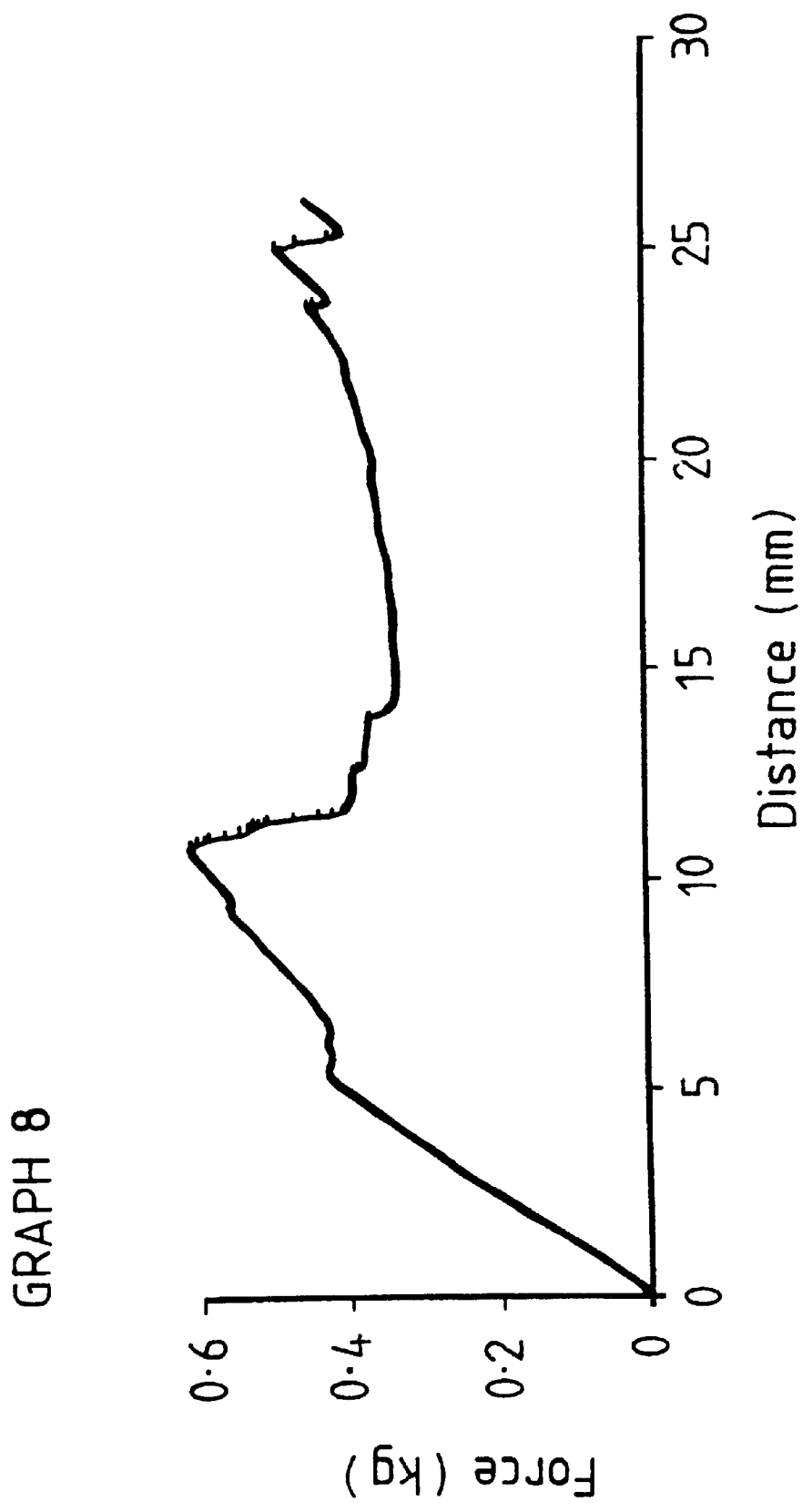
FIG. 8 shows a texture profile for a gelled product containing suspended microparticles with 0.10% w/w iota-carrageenan.
Figure 9:
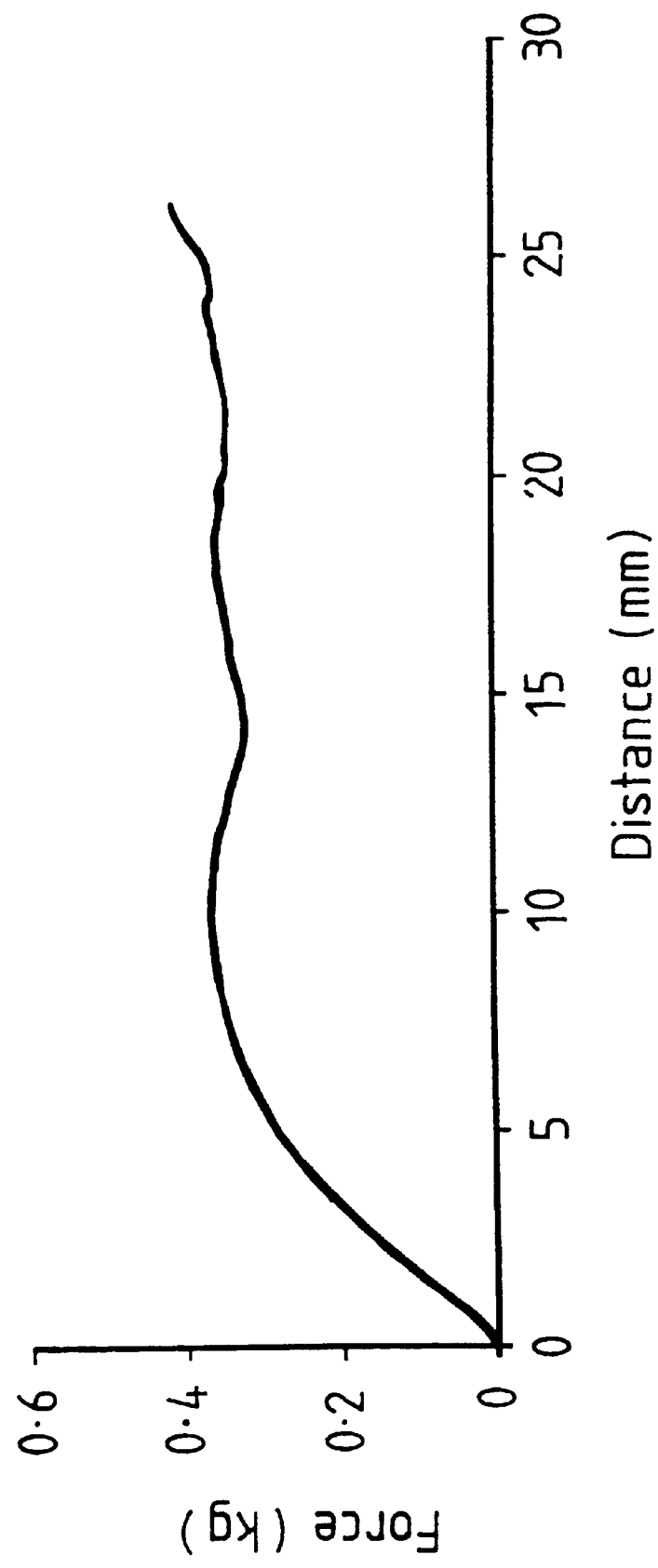
FIG. 9 shows a texture profile for a gelled product containing suspended microparticles with 0.30% w/w iota-carrageenan.
Figure 10:
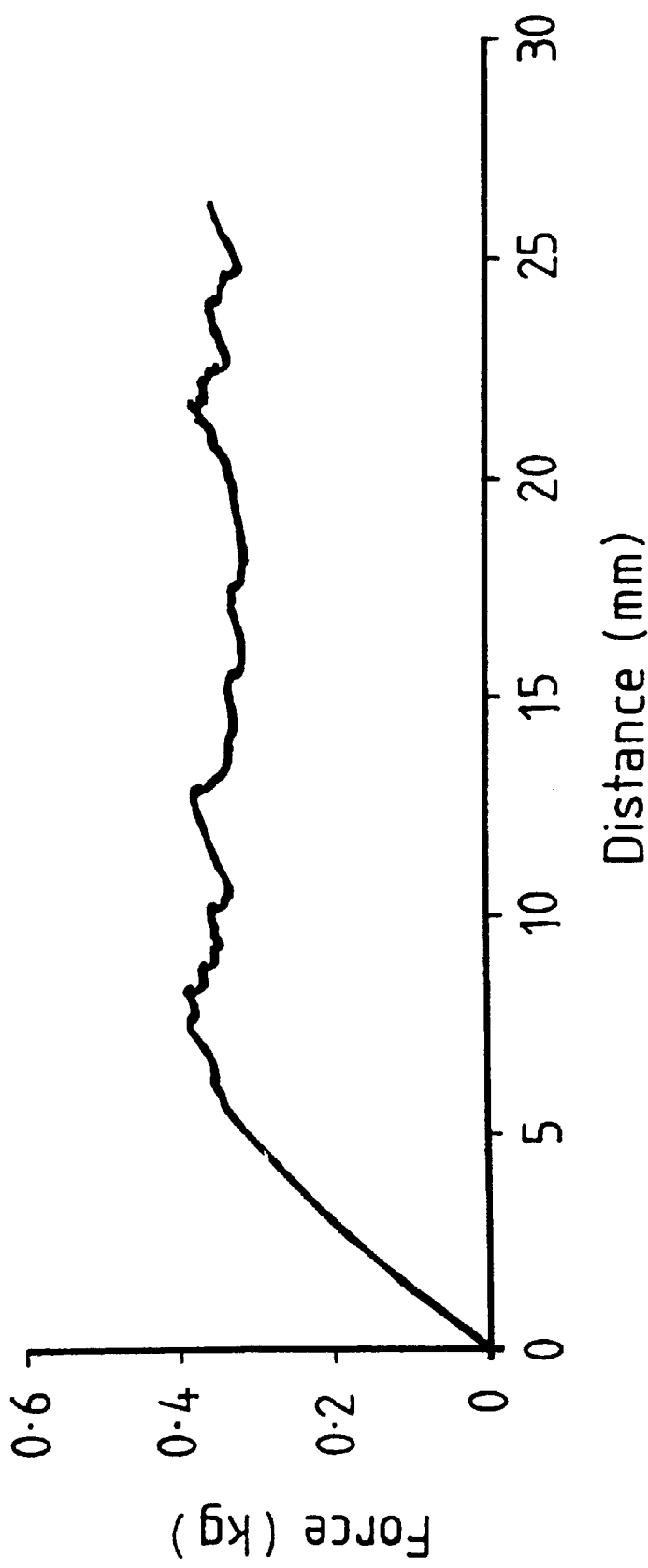
FIG. 10 shows a texture profile for a gelled product containing suspended microparticles with 0.05% w/w kappa-carrageenan.
Figure 11:
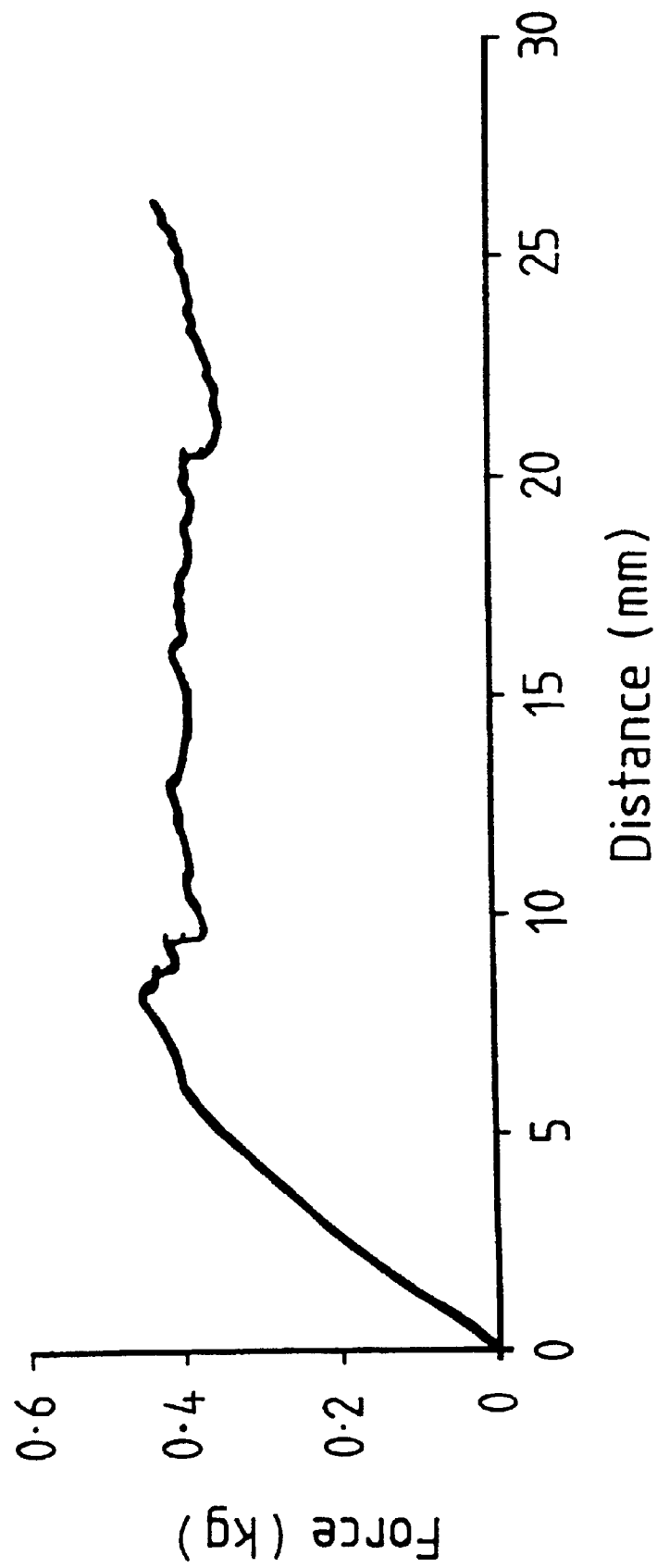
FIG. 11 shows a texture profile for a gelled product containing suspended microparticles with 0.10% w/w kappa-carrageenan.
Figure 12:
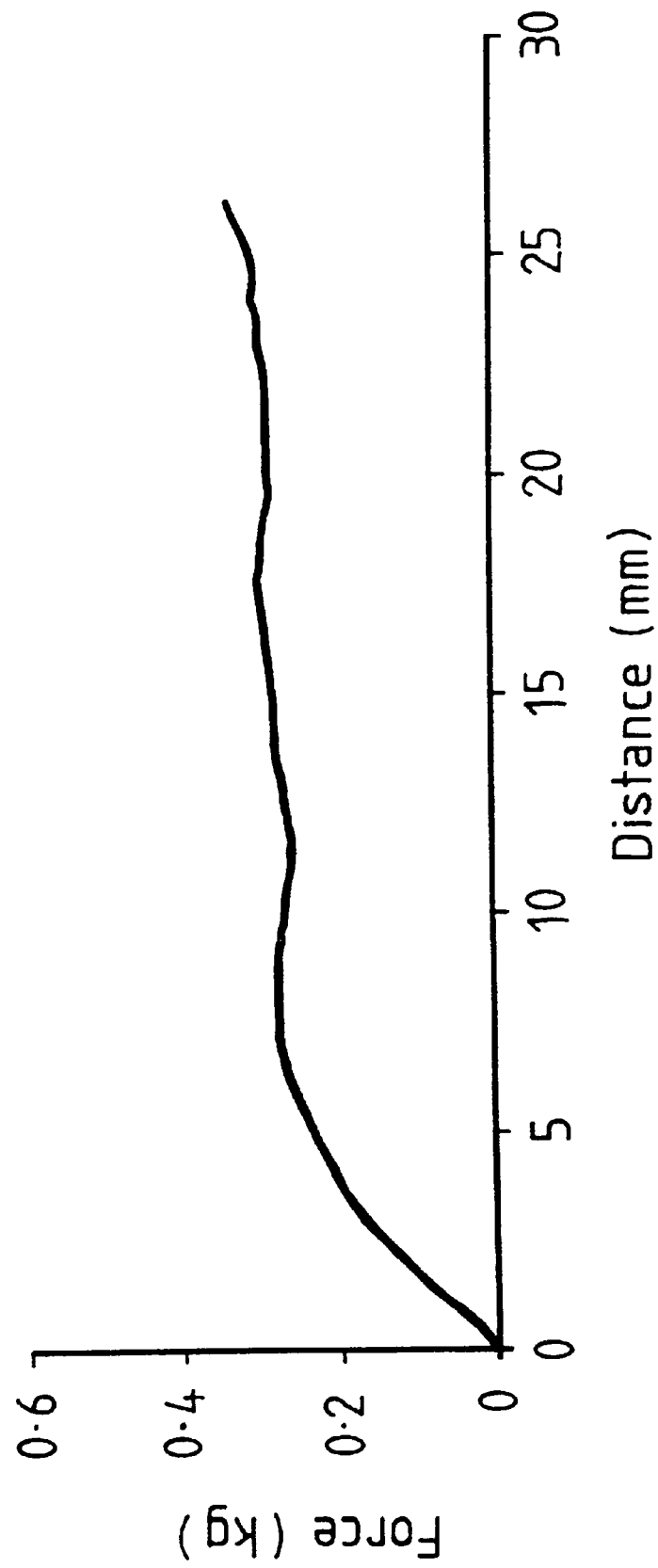
FIG. 12 shows a texture profile for a gelled product containing suspended microparticles with 0.30% w/w kappa-carrageenan

According to one aspect of the present invention, there is provided a food ingredient, characterised in that it comprises a heat-set protein gel and a polysaccharide hydrocolloid which is present in an amount sufficient to influence the structure and texture of the gel.

The heat-set protein gel is formed by heating a suitable gellable protein. Suitable gellable proteins may be sourced from egg white, blood serum or whey. The protein is preferably derived from a whey product rich in β-lactoglobulin, most preferably enriched β-lactoglobulin in the form of β-Fraction.

The preferred polysaccharide hydrocolloid is carrageenan, especially iota- or kappa-carrageenan.

A food product, in accordance with this invention can consist solely of the food ingredient defined above. More usually, however, the food product will contain other ingredients which may be incorporated into the protein gel or which may be simply mixed with the gel. For example, as described in WO93/00832, an edible food ingredient may be mixed with. or dispersed in, a solution of the gellable protein. before it is heated to form the gel. Alternatively, the gel may be formed first and then mixed with the other ingredient(s), some of which are also described in WO93/00832. Examples of such ingredients include fats or oils (which may be incorporated in a microparticulate state) and particulate foods such as meats or fruits.

One application of the food ingredients of the invention (referred to herein as "texture-modified gelled products") is in the replacement of fat in products to which fat is normally added. Typical of such application is the replacement of added fat, such as pork back fat, in manufactured meat products in which the added fat contributes advantageously to the texture of the food and may be a special feature of its appearance. The texture-modified gelled products may be chopped or minced and used in manufactured meat products in a manner comparable to that currently employed for fat incorporation. For example, a reduced-fat Strassburg-type sausage may be manufactured in which the typical pieces of visible fat are replaced by the texture-modified gelled product.

In another application of the texture-modified gelled products in preparing reduced-fat food materials, the texture-modified gelled product is added as an additional constituent of the finished product thereby effectively reducing the overall fat content of the finished product. For this purpose. the texture-modified gelled product may incorporate microparticulate oil or fat emulsion to contribute to mouthfeel and the ability to carry fat-soluble colour, flavour or nutritionally advantageous materials. Alternatively. such lipidic material may be omitted if such additional contributions are not required. Food applications of this type may be in the form of extended manufactured meat products including extended ham and chopped meat products. In such applications the texture-modified gelled products may provide a desirable texture and mouthfeel and through additionally incorporated coloured microparticulate material or soluble colourants may resemble in appearance the meat constituents. Such extended food products alternatively may be meat analogues or manufactured fish and seafood products.

A yet further application of the texture-modified gelled products is in the formation of new or modified foods in which food pieces of visible dimensions (i.e. not microparticulate) are incorporated and distributed through the gelled product. When so used, the texture-modified gelled product provides a base material of desirable texture which may be augmented by incorporation of insoluble microparticulate and soluble materials to enhance the colour, flavour and nutritional value or inclusion of larger food material pieces for special appearance or texture. This type of product may incorporate a microparticulate emulsion and pieces of food material of meat, fish, egg, vegetable or other origin.

According to another aspect, the invention provides a process for the preparation of a food ingredient as defined above, which comprises the steps of:

(i) preparing a solution of gellable protein at a concentration such that when mixed with other components of the formulation a uniform gel will be formed on being heated;

(ii) if necessary, adjusting the pH of the protein solution to be in the range 3.5 to 7.5;

(iii) preparing a solution of an appropriate polysaccharide hydrocolloid at a concentration such that,when mixed with the solution of gellable protein from (i) and other components of the formulation, it will result in a fat-like texture in the resulting heat-gelled protein product;

(iv) heating the polysaccharide hydrocolloid solution to activate the hydrocolloid and subsequently holding at a temperature in the range 50° to 60° C. to maintain solubility;

(v) heating the protein solution from (i) to a temperature in the range 50° to 60° C. as selected in (iv);

(vi) mixing the heated solutions from (iv) and (vi) in proportions such that the gellable protein content of the mixture is in the range 5 to 15% and the polysaccharide hydrocolloid concentration is in the range 0 to 1%;

(vii) if necessary, adjusting the pH of the mixture from (vi) to be in the range 3.5 to 7.5, as selected in (ii);

(viii) heat treating the mixture from (vi) or (vii) at a temperature and for a time sufficient to form a gelled product; and (ix) cooling the heat-gelled product to ambient or sub-ambient temperature.

If desired, an emulsion of an edible fat or oil heated to a temperature in the range 50° to 60° C. as selected in (iv) and, if necessary, having its pH adjusted to the value selected in (ii), can be added to the mixture at step (vi).

Water-soluble substances, such as colorants, flavorants and sweeteners may be added, if required, to the solution at an appropriate step, e.g. (i) or (ii).

Lipid-soluble colorants, flavorants and other adjuncts such as nutritionally advantageous materials may be included in the lipidic phase of any emulsion added at step (vi).

One or more insoluble microparticulate materials, which may contribute to colour, flavour or nutritive value may be incorporated into the texture-modified gelled product, by adding them, if necessary in the form of a dispersion at an appropriate step of the process.

Insoluble materials of microparticulate or visible dimensions may also be included in the composite mixture prior to heat gelation.

Generally, activation of the hydrocolloid should be carried out in accordance with the manufacturer's specifications.

The preferred parameters for the composition of the product and for the process of its preparation are now described in more detail.

The rigidity of the gelled product prepared by heating a solution of a protein containing a polysaccharide hydrocolloid under controlled conditions is determined primarily by the concentration of protein. For β-Fraction, generally, the lower limit of concentration is 5%. which typically represents the minimum concentration of protein for gel formation and the upper limit is 15%, which typically represents the maximum usable hardness of a gel for use in a food system. The preferred concentration of β-Fraction for a fat-like product is in the range 8 to 12%.

We have discovered that a number of polysaccharide hydrocolloids affect the structure and texture of whey protein/β-Fraction gels; such effects include increased granularity and increased or reduced water-holding ability of the heat-set protein gel. For the preparation of fat-like products for use as ingredients in reduced-fat foods, a number of polysaccharides have been evaluated. The incorporation of carrageenan is preferred. While effects on the structure and texture of heat-set, β-Fraction gelled products have been observed after incorporation of carrageenan at all levels in the range 0 to 1%, at low levels of incorporation (less than 0.15%) a gel strengthening effect was observed. At higher levels, further structural and textural effects of the added carrageenan were observed such that, while the gelled product remained firm and cohesive, no distinct fracture point was discernible. The preferred concentration of carrageenan in the gelled product is in the range 0.2 to 0.4%.

The nature of the gelled product, and particularly its texture, is also determined by the pH. Generally the pH will be in the. range 3.5 to 7.5. For the gelled products comprising β-Fraction and carrageenan only to have fat-like properties, the preferred pH is in the range 5.8 to 6.8, more preferably 5.9 to 6.2. At the lower end of this last range, i.e. pH 5.9–6.1 the gelled products will have a soft texture. A firmer product is obtained at about pH 6.2.

The heat gelation process occurs: at a temperature in excess of the denaturation temperature of β-lactoglobulin which is in the range 71 to 75° C. dependent on pH and other environmental parameters. The gelled product may be prepared by heating at a temperature in the range 65 to 100° C. The gel firmness increases with the time of heating up to a maximum value. Generally, the heating time will be in the range 5 to 120 minutes. For comparative analytical purposes, the preferred heating conditions may be stated as: immersion of the sample, tightly contained in a 50 mm diameter water-impermeable casing, in a water-bath at 90° C. for 30 minutes followed by cooling in running cold water.

As indicated above, the β-Fraction and polysaccharide hydrocolloid gelled product may optionally contain an emulsion of fat or oil. While apparently contributing little to the structure and texture of the gelled product, incorporation of some lipidic material assists the mouthfeel of the product. Up to 20% by weight of the lipidic material may be present, the preferred level of addition being such that the concentration of lipidic material in the final product is in the range 5 to 10%. The emulsion may conveniently be prepared by emulsifying an edible fat or oil by homogenisation with sufficient protein or non-protein emulsifier in aqueous dispersion at a temperature in the range 50° to 60° C. as selected in step (iv) above to form a stable oil-in-water emulsion and, if necessary, adjusting the pH to be in the range 3.5 to 7.5, as selected for step (ii).

The invention is further described and illustrated by reference to the following non-limiting examples.

EXAMPLE 1

This example shows that the texture of the gelled product is altered by the incorporation of polysaccharide hydrocolloid as evidenced by the amount of free serum, the yield point and maximum firmness together with the rupture profile.

(i) Gelled Product with No Suspended Microparticulates

Two aqueous solutions of β-Fraction (89% protein on a dry matter basis; 83% of the protein being β-lactoglobulin) were prepared at pH 6. 10 and a protein content of 9% (w/w) and warmed to 60° C. 2.5% solutions of carrageenan were prepared from iota-carrageenan (Viscarin ME389 Tech. spec. 448) and kappa-carrageenan (Gelcarin ME911 Tech. spec. 481), both manufactured by FMC Corporation, Marine Colloids Division, 1735 Market Street, Philadelphia Pa.19103, USA. For activation of the carrageenans in accordance with the manufacturers instructions, the solutions were heated to 85° C. then cooled to 60° C. Composite solutions were made by combining different weights of carrageenan solution and β-Fraction solution to give final carrageenan concentrations in the range 0 to 0.3%. A control sample was prepared without carrageenan.

Aliquots (120 ml) of each solution were placed and sealed in Glowrap PVDC seamless casing of 50 mm flat width. Each sample was heated by immersion in a water bath at 90° C. for 30 min., cooled in running tap-water for 1 hour, refrigerated for 15 min. and equilibrated at 20° C. Slices 30 mm in length were cut from the gelled protein product and evaluated for gel strength i.e. yield point, fracture point and maximum firmness using a Stable Micro Systems TAXT2 texture analyser in compression mode with a test speed of 0.8 mm/sec and fitted with a flat 10 mm diameter circular disc probe which was applied to the centre of the cut surface. A pre-weighed piece of adsorbent paper was placed under each sample during rupture testing. After completion of each test. the sample was removed, the paper reweighed and the weight difference noted as a measure of the expelled free moisture/fat. Results are shown in Tables 1.1 and 1.2 for iota-carrageenan and kappa-carrageenan respectively. Reported values are each the mean of three determinations.

TABLE 1.1

| | Iota-carrageenan | | | | |
|---|---|---|---|---|---|
| Carrageenan conc. % w/w | Yield point* (kg) | Maximum firmness (kg) | Free moisture/fat | Compression at yield point (%) | Figure number |
| 0.00 | 0.384 | 0.457 | 0.097 | 34.38 | 1 |
| 0.10 | 0.431 | 0.431 | 0.057 | 25.61 | 2 |
| 0.30 | 0.203 | 0.238 | 0.076 | 20.06 | 3 |

TABLE 1.2

Kappa-carrageenan

| Carrageenan conc. % w/w | Yield point* (kg) | Maximum firmness (kg) | Free moisture/fat | Compression at yield point (%) | Figure number |
|---|---|---|---|---|---|
| 0.00 | 0.384 | 0.457 | 0.097 | 34.38 | 1 |
| 0.10 | 0.140 | 0.172 | 0.206 | 20.35 | 4 |
| 0.30 | 0.108 | 0.123 | 0.132 | 19.50 | 5 |

(ii) Gelled Product Containing Suspended Microparticulates

A microparticulate dispersion. of lard in water was prepared at 60° C. by 4-stage homogenisation using an homogeniser ex Milko-Tester Mk II (Foss Electric) using β-Fraction to stabilise the emulsion at an oil:protein ratio of 45:2. The microparticulate dispersion at 60° C. was mixed with solution of β-Fraction and carrageenan solution if required as in Example 1(i) to give a final concentration of 9% (w/w) of protein and a final fat content of 7.5% (w/w).

Aliquots of each mixture were heated to stabilise the microparticulate dispersion in a gelled protein-carrageenan matrix or gelled protein only matrix, as in the control, under conditions as in Example 1(i). Results are shown in Tables 2.1 and 2.2 for iota- and kappa-carrageenans respectively. Each of the values reported is a mean of three determinations.

TABLE 2.1

Iota-carrageenan

| Carrageenan conc. % w/w | Yield point* (kg) | Maximum firmness (kg) | Free moisture/fat | Compression at yield point (%) | Figure number |
|---|---|---|---|---|---|
| 0.00 | 0.139 | 0.175 | 0.161 | 19.15 | 6 |
| 0.05 | 0.499 | 0.499 | 0.064 | 22.77 | 7 |
| 0.10 | 0.432 | 0.432 | 0.065 | 15.93 | 8 |
| 0.30 | 0.271 | 0.381 | 0.056 | 14.73 | 9 |

TABLE 2.2

Kappa-carrageenan

| Carrageenan conc. % w/w | Yield point* (kg) | Maximum firmness (kg) | Free moisture/fat | Compression at yield point (%) | Figure number |
|---|---|---|---|---|---|
| 0.00 | 0.139 | 0.175 | 0.161 | 19.15 | 6 |
| 0.05 | 0.339 | 0.339 | 0.108 | 16.67 | 10 |
| 0.10 | 0.392 | 0.392 | 0.182 | 18.11 | 11 |
| 0.30 | 0.209 | 0.280 | 0.122 | 11.72 | 12 |

Figure 13:
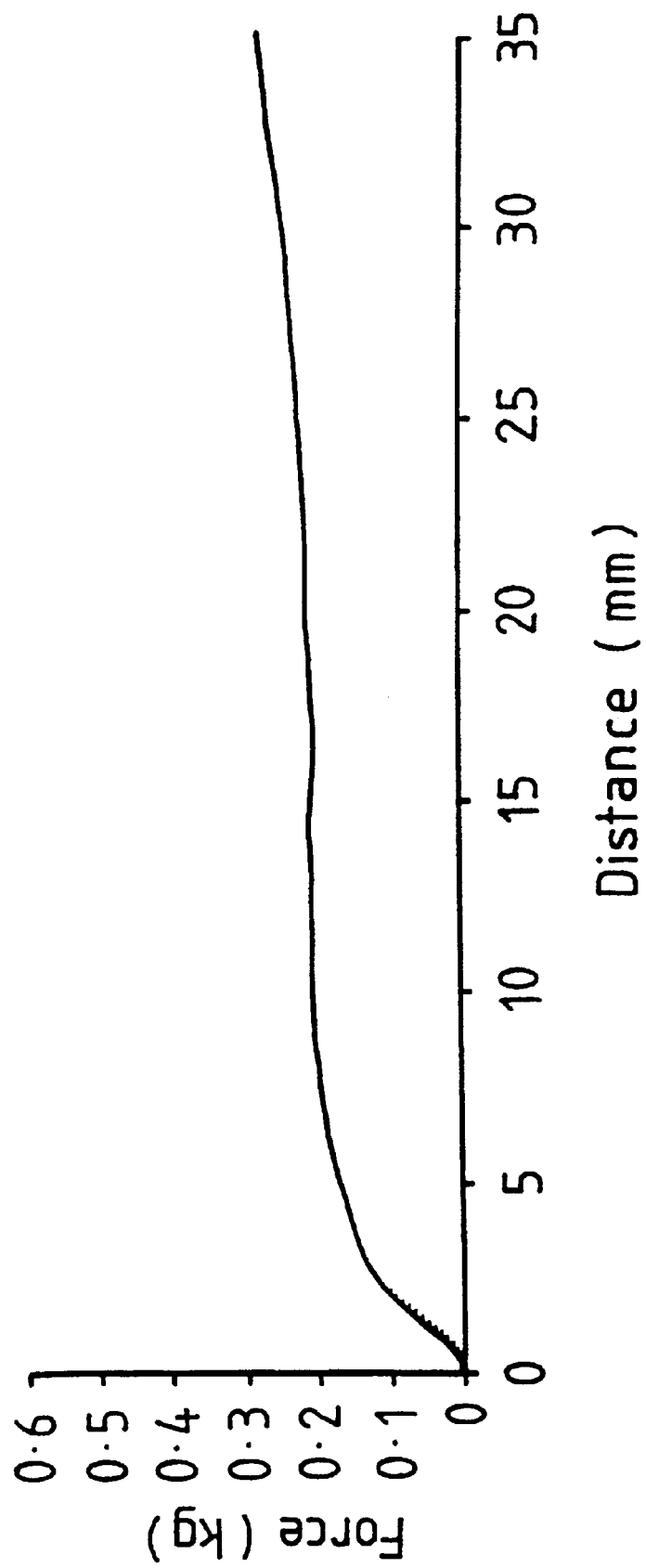
FIG. 13 shows a texture profile for lard.

Yield point is taken as the value of firmness at the point of deviation from linearity in the Firmness versus Distance plot shown in the accompanying figures by the Stable Micro Systems TAXT2 texture analyser. For comparison purposes FIG. 13 shows the performance of a sample of lard tested under the same conditions as the other samples.

EXAMPLE 2

This example shows that certain other whey products rich in β-lactoglobulin display similar ability to form heat-set gels which can also be texture modified by inclusion of polysaccharide hydrocolloid such as carrageenan.

Two aqueous solutions of a whey protein concentrate derived from acid casein whey (75.9% protein on a dry matter basis; 71% of the protein being β-lactoglobulin) were prepared at pH 6.10 and a protein content of 9% w/w. Iota-carrageenan was added to one of the solutions but not the other. Gelled products were prepared as in Example 1(i).

Figure 14:
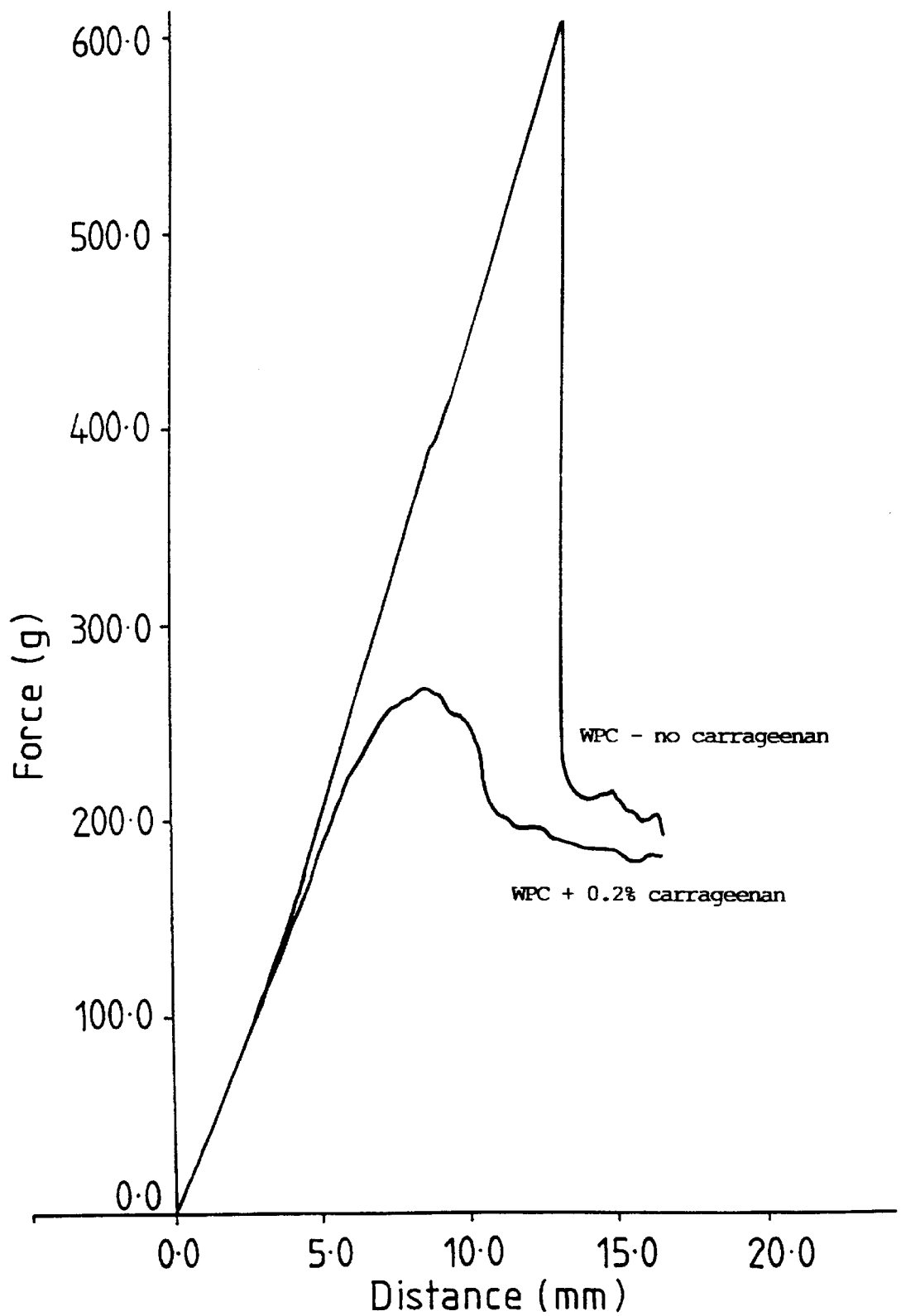
FIG. 14 shows texture profiles of heat-set gels from whey protein concentrate.

Samples were evaluated for textural properties as in Example 1(i). Result are shown in FIG. 14.

EXAMPLE 3

This example shows that protein other than whey protein displays similar ability to form heat-set gels which can also be texture modified by inclusion of polysaccharide hydrocolloid such as carrageenan.

Two aqueous solutions of spray dried egg white (85.3% protein on a dry matter basis) were prepared at pH 6.10 and a protein content of 9% w/w. Iota-carrageenan was added to one of the solutions but not the other. Gelled products were prepared as in Example 1(i).

Figure 15:
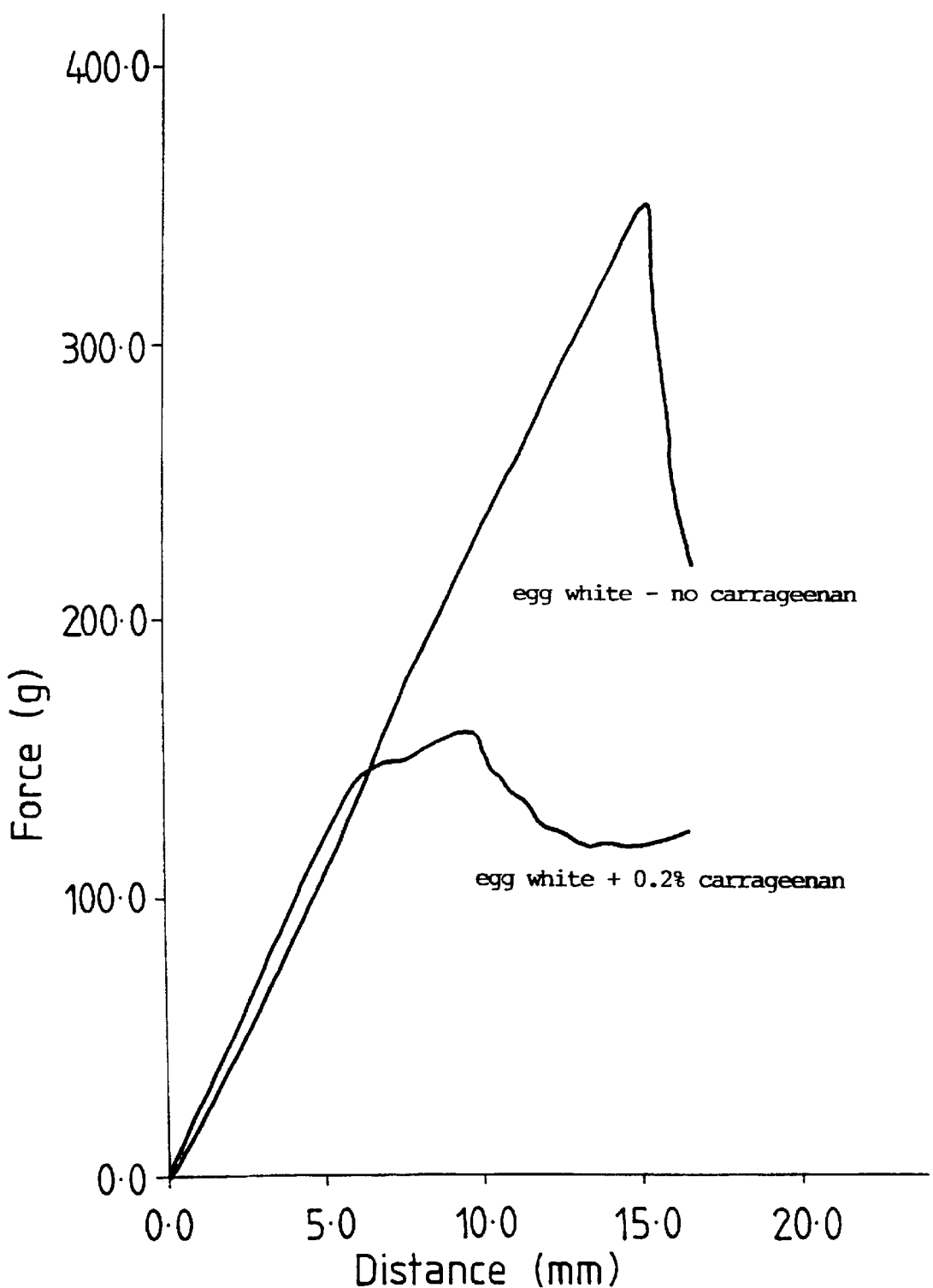
FIG. 15 shows texture profiles of heat-set gels from egg white protein.

Samples were evaluated for textural properties as in Example 1(i). Results are shown in FIG. 15.

Throughout this specification and any claims which follow, unless the context requires otherwise, the word "comprise", or variations such as "comprises" or "comprising", will be understood to imply the inclusion of a stated integer or group of integers but not the exclusion of any other integer or group of integers.

Those skilled in the art will appreciate that the invention described herein is susceptible to variations and modifications other than those specifically described. It is to be understood that the invention includes all such variations and modifications which fall within its spirit and scope. The invention also includes all the steps. features. compositions and compounds referred to or indicated in this specification. individually or collectively, and any and all combinations of any two or more of said steps or features.

The claims defining the invention are as follows:

1. A food ingredient comprising a heat-set protein gel, said heat-set protein gel comprising:
   (a) a gellable whey protein composition comprising β-lactoglobulin; and
   (b) up to 1% weight polysaccharide hydrocolloid per weight heat-set protein gel, wherein the polysaccharide hydrocolloid comprises iota carrageenan, kappa carrageenan or a mixture thereof and wherein the amount of polysaccharide hydrocolloid is such that the heat-set protein gel does not display a distinct fracture point.

2. A food ingredient as claimed in claim 1 wherein the gellable whey protein composition is β-Fraction.

3. A food product comprising:
   a food ingredient comprising a heat-set protein gel, said heat-set protein gel comprising:
   (a) a gellable whey protein composition comprising β-lactoglobulin; and
   (b) up to 1% weight polysaccharide hydrocolloid per weight of heat-set protein gel, wherein the polysaccharide hydrocolloid comprises iota carrageenan, kappa carrageenan or a mixture thereof and wherein the amount of polysaccharide hydrocolloid is such that the heat-set protein gel does not display a distinct fracture point;
   in admixture with other edible food ingredients.

4. A food ingredient as claimed in claim 1, further comprising a microparticular oil or fat emulsion.

5. A food product as claimed in claim 3, wherein the other edible food ingredients.are food pieces of dimensions visible to the naked eye.

6. A process for the preparation of a food ingredient as claimed in claim 1 comprising the steps of:
   (i) preparing a solution of the gellable whey protein composition having a pH in the range of 5.8 to 6.8, wherein the gellable whey protein composition concentration is such that when mixed with other components of the food ingredient a uniform gel will be formed on heating;
   (ii) preparing a solution of polysaccharide hydrocolloid comprising iota carrageenan, kappa carrageenan or a mixture thereof, at a concentration such that, when mixed with the solution of gellable whey protein composition from (i) and other components of the food ingredient, it will result in a fat-like texture in the resulting food ingredient;
   (iii) heating the solution of polysaccharide hydrocolloid comprising iota carrageenan, kappa carrageenan or a mixture thereof, to a temperature sufficient to activate the polysaccharide hydrocolloid, and subsequently adjusting the temperature of the solution to or holding the solution at a temperature from 50° to 60° C. to maintain solubility;
   (iv) heating the solution of gellable whey protein composition from (i) to a temperature in the range of 50° to 60° C.;
   (v) preparing a mixture of the heated solutions from (iii) and (iv) having a pH of between 5.8 and 6.8, the proportions of the heated solutions being such that the gellable whey protein composition content of the mixture is in the range of 5 to 15% and the polysaccharide hydrocolloid comprising iota carrageenan, kappa carrageenan or a mixture thereof is up to 1%;
   (vi) heating the mixture from (v) to a temperature in the range of 65° to 100° C. for a time sufficient to form a gel; and
   (vii) cooling the gel from (vi) to ambient or sub-ambient temperature to form the food ingredient.

7. A process as claimed in claim 6, further comprising adding an emulsion of an edible fat or oil heated to a temperature in the range of 50° to 60° C. and having a pH in the range of 3.5 to 7.5 to the mixture at step (v).

8. A process as claimed in claim 7, further comprising adding lipid soluble material selected from the group consisting of lipid soluble colorants and lipid soluble flavorants to the edible fat or oil.

9. A process as claimed in claim 6, wherein at least one of water soluble colorants, water soluble flavorants or water soluble sweeteners are added to the solution of gellable whey protein composition or the polysaccharide hydrocolloid solution.

10. A food ingredient as claimed in claim 1 wherein the carrageenan is present in a concentration of 0.2 to 0.4% weight per weight.

11. A food ingredient as claimed in claim 4, further comprising one or more additional sweeteners lipid soluble colorants, flavorants or nutritionally advantageous adjuncts.

12. A food ingredient as claimed in claim 1, further comprising one or more additional water soluble colorants, flavorants or sweeteners.

13. A process for preparing a food product as claimed in claim 3 comprising the steps of:
   (i) preparing a solution of a gellable whey protein composition having a pH in the range of 5.8 to 6.8, wherein the gellable whey protein composition concentration is such that when mixed with other components of the food ingredient a uniform gel will be formed on heating;
   (ii) preparing a solution of polysaccharide hydrocolloid comprising iota carrageenan, kappa carrageenan or a mixture thereof, at a concentration such that, when mixed with the solution of gellable whey protein composition from (i) and other components of the food ingredient, it will result in a fat-like texture in the resulting food ingredient;
   (iii) heating the solution of polysaccharide hydrocolloid comprising iota carrageenan, kappa carrageenan or a mixture thereof, to a temperature sufficient to activate the polysaccharide hydrocolloid, and subsequently adjusting the temperature of the solution to or holding the solution at a temperature from 50° to 60° C. to maintain solubility;
   (iv) heating the solution of gellable whey protein composition from (i) to a temperature in the range of 50° to 60° C.;
   (v) preparing a mixture of the heated solutions from (iii) and (iv) having a pH of between 5.8 and 6.8, the proportions of the heated solutions being such that the gellable whey protein composition content of the mixture is in the range of 5 to 15% and the polysaccharide hydrocolloid comprising iota carrageenan, kappa carrageenan or a mixture thereof is up to 1%;
   (vi) heating the mixture from (v) to a temperature in the range of 65° to 100° C. for a time sufficient to form a gel;
   (vii) cooling the gel from (vi) to ambient or sub-ambient temperature to form said food product,
   and wherein at least one edible food ingredient selected from:

(A) one or more microparticulate insoluble materials or soluble materials which are colorants or flavorants; and (B) insoluble food pieces of dimensions visible to the naked eye;

is added to the solutions produced at any one of steps (i) to (v).

14. A process for preparing a food product comprising mixing a food ingredient comprising a heat-set protein gel; said heat-set protein gel comprising:

(a) a gellable whey protein composition comprising β-lactoglobulin; and (b) up to 1% weight polysaccharide hydrocolloid per weight of heat-set protein gel, wherein the polysaccharide hydrocolloid comprises iota carrageenan, kappa carrageenan or a mixture thereof and wherein the amount of polysaccharide hydrocolloid is such that the heat-set protein gel does not display a distinct fracture point;

with at least one of:

(i) one or more microparticulate insoluble materials or soluble materials which are colorants or flavorants; or (ii) insoluble food pieces of dimensions visible to the naked eye.

15. A food ingredient comprising a heat-set protein gel, said heat-set protein gel comprising:

(i) a gellable whey protein composition comprising at least 71% weight β-lactoglobulin per,weight of whey proteins; and (ii) up to 1% weight polysaccharide hydrocolloid per weight of heat-set protein gel, wherein the polysaccharide hydrocolloid comprises iota carrageenan, kappa carrageenan or a mixture thereof and wherein the amount of polysaccharide hydrocolloid is such that the heat-set protein gel does not display a distinct fracture point.

16. A food ingredient comprising a heat-set protein gel, said heat-set protein gel comprising:

(i) 5 to 15% weight gellable whey protein composition per weight of heat set protein gel, said gellable whey protein composition comprising β-lactoglobulin; and (ii) up to 1% weight polysaccharide hydrocolloid per weight heat-set protein gel, wherein said polysaccharide hydrocolloid comprises iota carrageenan, kappa carrageenan or a mixture thereof and wherein the amount of polysaccharide hydrocolloid is such that the heat-set protein gel does not display a distinct fracture point.

17. A food ingredient comprising a heat-set protein gel, said heat-set protein gel comprising:

(i) 5 to 15% weight gellable whey protein composition per weight of heat-set protein gel, said gellable whey protein composition comprising β-lactoglobulin; and (ii) up to 0.2% to 0.4% weight polysaccharide hydrocolloid per weight of heat-set protein gel, wherein said polysaccharide hydrocolloid comprises iota carrageenan, kappa carrageenan or a mixture thereof and wherein the amount of polysaccharide hydrocolloid is such that the heat-set protein gel does not display a distinct fracture point.

18. A food ingredient comprising a heat-set protein gel, said heat-set protein gel comprising:

(i) 5 to 15% weight gellable whey protein composition per weight heat-set protein gel, said gellable whey protein composition consists of β-Fraction;

(ii) up to 1% weight iota carrageenan, kappa carrageenan or a mixture thereof, per weight heat-set protein gel, wherein the heat-set protein gel does not display a distinct fracture point.

19. A food ingredient comprising a heat-set protein gel, said heat-set protein gel comprising:

(i) 5 to 15% weight gellable whey protein composition per weight of heat-set protein gel, wherein said gellable whey protein consists of β-Fraction;

(ii) 0.2 to 0.4% weight iota carrageenan, kappa carrageenan or a mixture thereof, per weight heat-set protein gel, wherein the heat-set protein gel does not display a distinct fracture point.

20. The food ingredient as claimed in claim 1 wherein the heat-set protein gel has a compression at its yield point of 10–20%.

21. The food ingredient as claimed in claim 20 wherein the heat-set protein gel has a firmness at its yield point of 0.1–0.3 Kg.

22. The food ingredient as claimed in claim 21 wherein the heat-set protein gel has a moisture loss of 0.05–0.15% when compressed.

* * * * *